W. GOODAIRE & G. STEAD.
RESTORING WASTE ALKALI USED IN OIL REFINERIES.
No. 101,003. Patented Mar. 22, 1870.
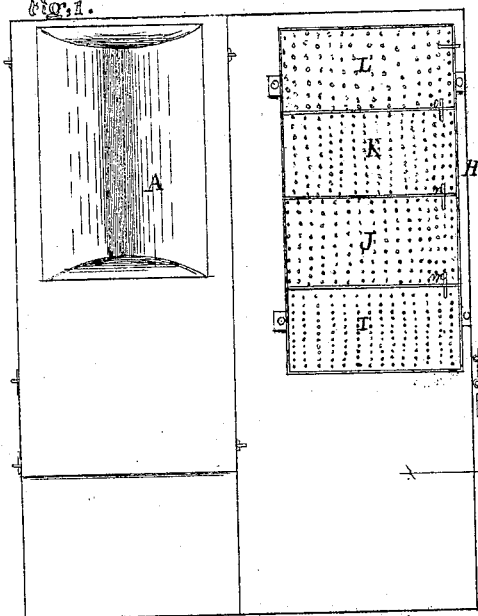
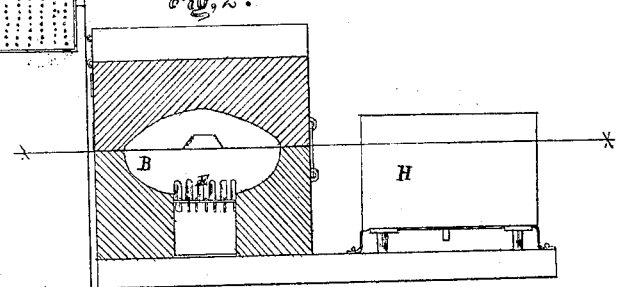
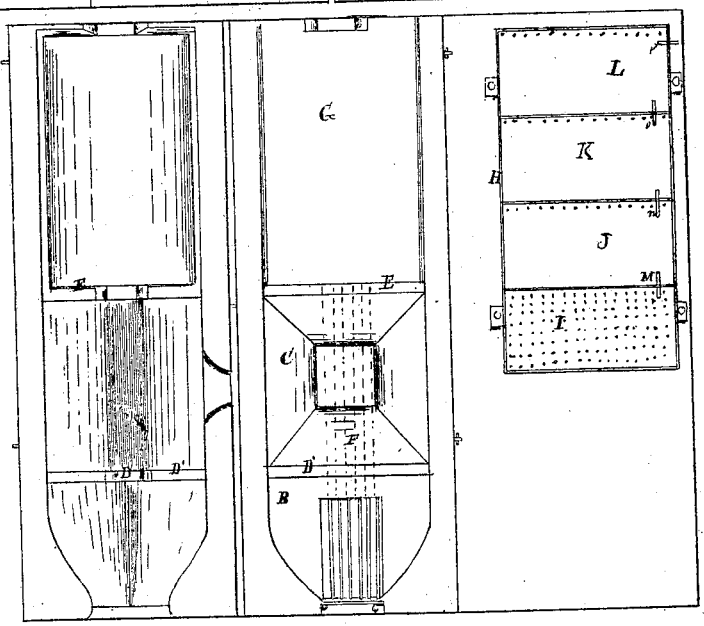
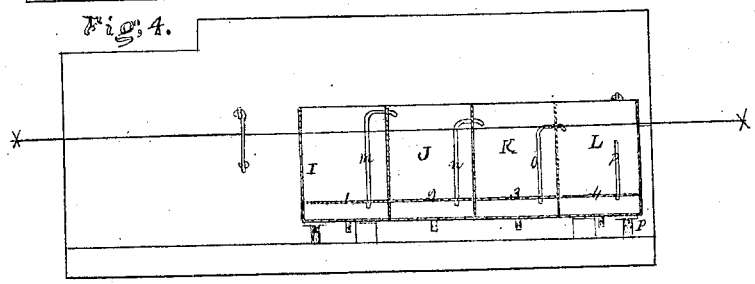

United States Patent Office.

WILLIAM GOODAIRE AND GEORGE STEAD, OF CLEVELAND, OHIO, ASSIGNORS TO OVANDER J. BENHAM, OF SAME PLACE.

Letters Patent No. 101,003, dated March 22, 1870.

IMPROVEMENT IN RESTORING WASTE ALKALI USED IN OIL-REFINERIES.

The Schedule referred to in these Letters Patent and making part of the same

*To all whom it may concern:*

Be it known that we, WILLIAM GOODAIRE and GEORGE STEAD, of Cleveland, county of Cuyahoga, State of Ohio, have invented a new and improved Process for Restoring Spent Alkali Used in Refining Petroleum; and we do hereby declare that the following is a full and complete description thereof, and the apparatus employed in said process, reference being had to the accompanying drawings, in which—

The nature of our invention relates to the process for restoring spent alkali used in refining petroleum, which spent alkali or waste consists of a variable quantity of sulphate of soda, carbonate of soda, and caustic soda, in connection with more or less impurities or oily matter.

To dispose of the latter the waste is first evaporated to dryness, which is then calcined in a proper furnace or oven, by which the oleaginous matter is almost completely removed, leaving what we designate as black ash. This black ash is then leached with water.

The carbonate of soda, sulphate of soda, and caustic soda is thus obtained in the filtrated solution, which is again treated by hydrated lime and other agents, as and for the purpose hereinafter more fully set forth.

To accomplish this result we use the apparatus as hereinafter described, and by which we utilize the alkali-waste from oil-refineries which has been heretofore thrown away.

We take the waste from the oil-refineries as it comes from the refining agitator, which is placed in the pan A, and subjected to the waste heat from the furnace B, by which means evaporation takes place, eliminating the watery portion of the material in the pan, which, in a short time, assumes a pasty condition, and by the continuation of the heat it becomes about the consistency of ordinary lard, which we designate as alkaline paste.

When in this state it is taken from the pan A and put into the furnace-oven C, when it is subject to the action of the heat from the furnace B. This heat causes the oily portion of the said material to be ignited, and will continue to burn until all the oleaginous matter is consumed, leaving a residue which we denominate black ash.

The fire and flame from the furnace B passes through the opening D in the side or partition wall D', then through the oven C, out through the opening in the partition wall E, and along the under side of the pan A, and out through the stack.

The fire from the furnace passes under the oven, also through the flues F into the flue G, and out through the stack or chimney. By this means the oven is subject to the influence of intense heat above and below, so as to rapidly reduce the material from the pan to black ash, which is composed of the carbonate of soda, sulphate of soda, and hydrate of soda, in variable proportions, the remainder being impurities, which are removed by a filtration or leaching process, as hereinafter described.

This subjecting the material from the pan to heat and flame in the oven is a distinguishing feature of our invention, and produces a marked change in the character of the material, as all the oleaginous matter is eliminated, leaving a residue composed of the elements before mentioned.

The heat from the furnace is used in the oven, first, for the purpose set forth, and then employed for reducing the fluid in the pan A, as before stated.

The black ash is nearly all soluble in water of 80° Fahrenheit, is taken from the oven, and, after cooling, is placed in the leaching or separating-tank H, which is composed of a series of chambers or compartments, I J K L. The black ash is then placed in all of the chambers, and the water is passed first into the chamber I.

At the bottom of each chamber is a perforated diaphragm or sieve, I, so as to allow the water as it passes in at the top, to filter through into the chamber below, with which is connected the pipe M, and as the water flows in it leaches the ash, dissolving the alkali therein, which passes down into the chamber below the diaphragm I; then, by means of the pipe M, it is conveyed to the chamber J, which has also a diaphragm, 2, and through which the fluid from the preceding chamber is leached.

Connected with the chamber below the diaphragm 2 is another pipe, n, which conveys the solvent to the chamber K, where it again passes through the black ash into the chamber below the diaphragm 3, and from which chamber is conveyed by pipe O into the chamber L, where filtration again takes place, into the chamber below the diaphragm 4. From this chamber it is withdrawn by the pipe p into a receiving-tank. In this filtrated liquid is sulphate of soda, carbonate of soda, hydrate of soda in variable proportions, and some impurities. This liquid or solution is transferred to a suitable vessel, where it is brought to a boiling heat, and then treated with a strong solution of milk of lime, made from fresh-burned lime, in sufficient quantity to convert the whole of the carbonate of soda present into the hydrate, (carbonate of lime being formed,) the object of this treatment being to convert all of the soda present, except the sulphate, into the most soluble form, or into a form the least susceptible of crystallization, so that the sulphate of soda may be separated by concentration and crystallization.

It is then transferred to a settling-tank, where the carbonate of lime is deposited, and the clear solution is drawn into proper evaporating vessels and concentrated, and allowed to stand until the sulphate of soda will crystallize out upon cooling. These crystals or sulphate of soda are converted into the carbonate of soda of commerce by the process usually known and practiced.

The liquid or hydrate of soda yet remaining in the tank is treated by any of the modes in practice, for converting it into soda-ash, or carbonate of soda, or caustic soda of commerce.

Claims.

1. We claim the process of treating spent alkali by first reducing the waste mentioned to a pasty state or alkaline paste by heat and evaporation, then subjecting the same to the action of heat, in a suitable oven or furnace, for the purpose of consuming the oleaginous portions of said alkaline paste and converting it into black ash, as set forth.

2. The employment of heat, in a suitable oven or furnace, for the purpose of converting the alkaline paste into black ash by consuming and separating the oleaginous portions of the alkaline paste from the alkaline elements, as set forth.

3. Treating the filtrated liquid, when in a hot boiling state, with the hydrated lime, substantially in the manner specified, for the purpose of separating the sulphate of soda from the solution of black ash by rendering the other forms of soda present less susceptible of crystallization, as set forth.

WILLIAM GOODAIRE.
GEORGE STEAD.

Witnesses:
W. H. BURRIDGE
D. L. HUMPHRY.